Figure 1:
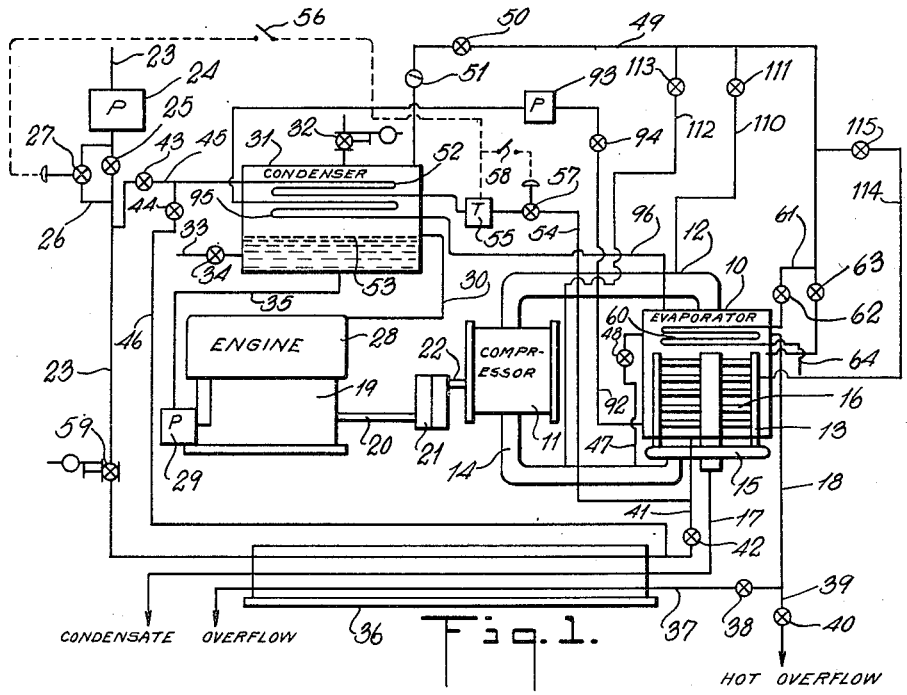

Nov. 13, 1945.  A. LATHAM, JR  2,389,064

METHOD OF AND APPARATUS FOR DISTILLATION

Filed Feb. 24, 1943

INVENTOR
Allen Latham Jr
BY
Kenyon & Kenyon
ATTORNEYS

Patented Nov. 13, 1945

2,389,064

UNITED STATES PATENT OFFICE 2,389,064

METHOD OF AND APPARATUS FOR DISTILLATION

Allen Latham, Jr., Jamaica Plain, Mass., assignor to Arthur D. Little, Inc., Cambridge, Mass., a corporation of Massachusetts Application February 24, 1943, Serial No. 476,882

20 Claims. (Cl. 202—75)

This invention relates to method of and apparatus for distillation. It relates particularly to distillation of the vapor-compression type wherein vapors generated in a vaporization zone are compressed until the condensing temperature thereof is above the boiling point of the solution in the vaporization zone and after compression are returned to the vaporization zone for condensation and giving up of heat to the solution in the vaporization zone so that the distillation operation may be maintained.

The method and apparatus of the present invention is applicable to the separation of components of a fluid mixture of two or more substances by reason of their difference in boiling point or volatility. The present invention is applicable where both the initial mixture and the separated components are liquids during some portion of the operation, but these liquids may be more or less concentrated solutions of solids, liquids, or gases in liquids or liquid mixtures of materials normally in gaseous form in the pure state. The present invention is applicable to what is commonly known as distillation, fractionation, rectification, evaporation, concentration and the like which are characterized by evaporation of a portion of a liquid mixture. Any such liquid mixture is referred to herein as a solution and any such operation is referred to herein as distillation for purposes of brevity.

It is a purpose of this invention to provide method and means for supplying heat to solution in the vaporization zone in a vapor-compression distillation system of the character aforesaid wherein the vapors evolved in the vaporization zone are compressed to a pressure at which their condensing temperature is above the boiling point of the solution in the vaporization zone and wherein the compressor is actuated by means of an internal combustion engine.

In Patent No. 2,280,093 issued to Robert V. Kleinschmidt there is disclosed a vapor-compression distillation unit wherein the compressor for compressing vapors is operated by an internal combustion engine and wherein heat derived from the internal combustion engine in cooling it to normal operating temperature is utilized to heat solution being fed into the system so as to preheat such incoming solution before it enters the vaporization zone. In my copending application Serial No. 475,401, filed February 10, 1943, for Distillation method and apparatus, improved means and method for preheating incoming solution being fed into the system before it reaches the vaporization zone are disclosed.

As distinguished from the utilization of heat derived from the internal combustion engine that actuates the compressor in order to preheat solution being fed into the system before it reaches the vaporization zone, heat derived from the internal combustion engine is, according to the present invention, used to supply heat to solution that is in the vaporization zone itself. The invention of the present application is particularly advantageous during the institution of a distillation operation of the vapor-compression type. During institution of distillation, solution contained in the vaporization zone has to be brought up to the boiling point of the solution and, according to the present invention this is accomplished by utilization of heat derived from the internal combustion engine. During institution of distillation the feed of fresh solution is slight or may even be wholly cut off and for this reason the method and means for utilization of heat derived from the internal combustion engine that are disclosed in said Patent No. 2,280,093 and in my copending application Serial No. 475,401 do not assist to any substantial extent in the institution of distillation.

During institution of distillation in a distillation unit of the vapor-compression type there is a considerable load on the compressor and considerable time is required in bringing the solution in the vaporization zone up to its boiling point. During institution of distillation there is very little vapor that becomes compressed by the compressor and that is available after compression to give up its heat by condensation in out-of-contact heat exchange relation with solution in the vaporization chamber. In the Kleinschmidt Patent No. 2,280,093 as well as in prior Kleinschmidt Patents Nos. 2,185,595 and 2,185,596, by-pass means is disclosed whereby air together with any vapors present in the vaporization chamber, after compression by the compressor, may be recirculated back into the vaporization chamber so that the work done by the compressor in recirculating the gases and vapors will result in heating them and will eventually result in heating the solution in the vaporization chamber, at least adjacent the surface, until vapors are evolved in the vaporization zone in sufficient amount to maintain the heat exchange cycle of the vapor-compression distillation operation. However, this procedure and means for instituting distillation is relatively slow and places a considerable load on the compressor. According to the present invention the distillation operation can be instituted much more rapidly and with much less load on the compressor.

The directing of fluid that is heated by heat derived from the internal combustion engine that operates the compressor of a vapor-compression distillation unit into the distillation zone or chamber, or vapor region or zone associated therewith, to heat solution contained in the vaporization zone or chamber, is the principal feature of the present invention and may be availed of whether or not the incoming feed is preheated and regardless of whether or not heat derived from the internal combustion engine is utilized in whole or in part as a source of heat for preheating fresh solution to be distilled that is contained in the feed means leading to the vaporization chamber. The fluid that is heated by heat derived from the internal combustion may be engine cooling liquid or vapor derived therefrom, or it may be solution removed from the vaporization zone or chamber and returned thereto after being heated by heat derived from the internal combustion engine. This invention may be practiced advantageously, but not necessarily in a system wherein the heat derived from the engine also is available as the source of heat for wholly or partially preheating the fresh solution contained in the feed means of the system. Such a combination has the advantage of affording most efficient use of engine heat during the institution and subsequent maintenance of distillation and has the advantage of assisting in the preheating of incoming solution so that as soon as the feed is turned on after distillation has been started the feed will have been preheated to the desired temperature.

Figure 2:
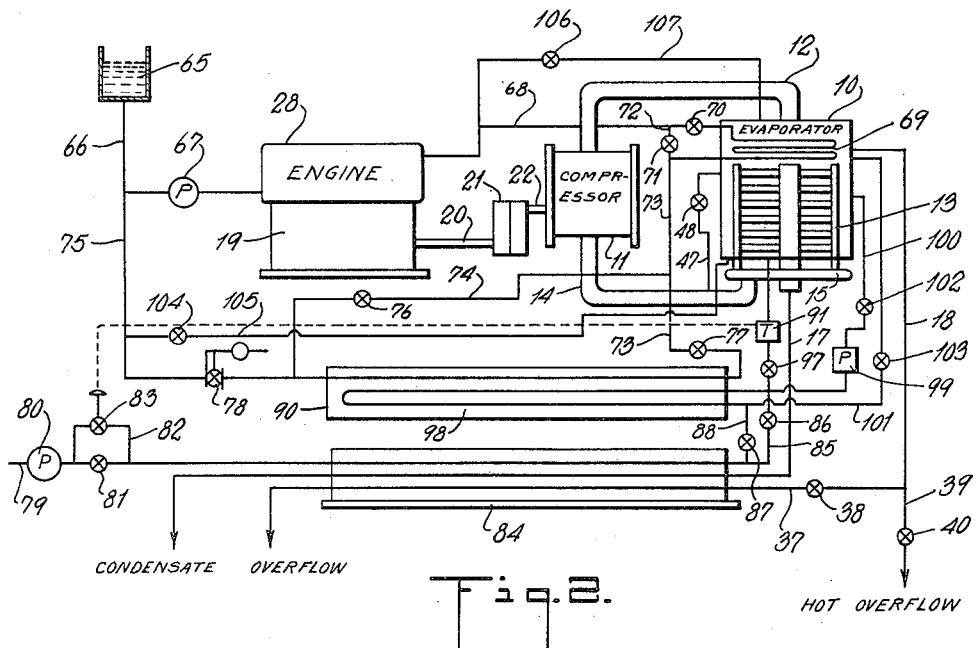

Further purposes, features and advantages of this invention will be apparent from the following description of this invention in connection with certain illustrative embodiments thereof shown in the accompanying drawing, wherein, Fig. 1 is a side elevational schematic view of one embodiment of this invention; and Fig. 2 is a side elevational schematic view of an alternative embodiment of this invention;

Referring to Fig. 1, a typical distillation unit of the vapor-compression type wherein the compressor is actuated by an internal combustion engine will first be described. The unit includes the vaporation chamber 10 and the compressor 11. Vapor evolved in the vaporization chamber 10 is taken to the suction side of the compressor by the suction vapor line 12. Within the vaporization chamber 10 is a condenser heat exchange means 13 adapted to maintain a condensing vapor in out-of-contact heat exchange with solution in the vaporization chamber 10. Vapor compressed by the compressor 11 is directed to the condenser heat exchange means 13 by pressure vapor line 14. The compressed vapor in line 14 enters the header 15 and thence passes into the condenser heat exchange means wherein it condenses in the passages thereof, inasmuch as the compressor serves to raise the condensing temperature of the compressed vapor to a temperature above the boiling point of the solution in the evaporator. The passages of the condenser heat exchange means in which the vapor condenses are indicated by the reference character 16 and are shown schematically. It is apparent that any suitable type of condenser heat exchange means adapted to receive vapor and permit the condensation thereof in out-of-contact heat exchange with solution in the vaporization chamber may be used. The condensate resulting from condensation of the compressed vapors in the condenser heat exchange means flows out of the condenser heat exchange means through the line 17. Concentrated solution is withdrawn from the vaporization chamber through the line 18 and the level of the mouth of the line 18 may serve to control the normal liquid level of solution in the vaporization chamber.

The compressor is operated by an internal combustion engine 19. This engine is of any conventional type having the combustion chamber walls cooled by a fluid which circulates around them or which boils in contact with them and may be a gasoline engine, a Diesel engine or the like, and for this reason the details of construction of the engine are not shown. The drive shaft 20 of the engine is connected directly or through suitable gearing 21 to the shaft 22 which actuates the compressor. If desired, a suitable clutch means, not shown, may be interposed between the drive shaft of the engine and the actuating shaft of the compressor.

The feed of solution to be distilled is introduced into the system through the line 23. The quantity of the feed that is introduced into the system may be controlled by a positive displacement pump 24 of such character that the quantity of feed introduced into the system can be controlled by the rate of operation of the pump. Suitable means, not shown, may be employed for varying the speed of the pump 24. Alternatively, a constant pressure pump may be employed or a gravity feed, and the quantity of solution fed into the system may be controlled by the valve 25. For use with certain embodiments to be referred to more in detail hereinbelow, the feed line 23 may be provided with a by-pass line 26 that is controlled by a thermostatic valve 27.

The internal combustion engine that is shown in Fig. 1 is of the type which is operated at the boiling point of the engine cooling liquid. The engine cooling liquid is forced through the cooling passages within the engine cooling jacket 28 by the action of the pump 29 and serves to cool the engine to normal operating temperature by boiling within the engine cooling passages. A mixture of engine cooling liquid together with vapor evolved in the engine cooling passages as a result of contact with heated surfaces of the internal combustion engine 19, is directed by the line 30 to the chamber 31 where the liquid separates from the vapor, the vapor rising to the upper portion of chamber 31 as shown. If desired, a safety valve 32 may be used in connection with the chamber 31. In order to replace any fluid that may escape from the engine cooling system in vapor form or otherwise, engine cooling liquid may be introduced into the chamber 31 through line 33, that is controlled by valve 34. The engine cooling liquid is returned to the pump 29 by the line 35.

The feed line 23 is shown in Fig. 1 as directing incoming feed through the preheater heat exchanger 36 where it is brought into out-of-contact counterflow heat exchange with hot distillate taken from the condenser heat exchanger 13 within the vaporization chamber 10. The feed, after it emerges from the preheater heat exchanger 36 is directed by the line 41 into the vaporization chamber 10. The line 41 is controlled by the valve 42. The draw-off line 18 is in communication with the line 37 controlled by valve 38 and is also in communication with the line 39 that is controlled by the valve 40. It is apparent, therefore, that all of the hot concentrated solution withdrawn from the chamber 10 may be directed through the preheater heat exchanger 36 for use in preheating the feed passing through the heat exchanger 36 or that all may be discharged through the line 39. Moreover, by adjusting the valves 38 and 40, any desired intermediate proportion of the overflow can be directed through the preheater heat exchanger 36.

Assuming that the valves 43 and 44 in lines 45 and 46 respectively, are closed, all of the feed will be directed through the line 23 through the preheater heat exchanger 36 into the vaporization chamber 10. The purpose of lines 45 and 46, which may be availed of in alternative means and method for practicing this invention, will be described hereinbelow.

In the apparatus above described a distillation operation of the vapor-compression type can be carried out. The vapor evolved in the vaporization chamber is compressed by the compressor and is returned to the condenser heat exchanger within the vaporization chamber at a pressure sufficiently high so that the condensing temperature is above the boiling point of the solution in the vaporization chamber. The feed entering the vaporization chamber is preheated by heat exchange with the hot distillate taken from the condenser heat exchanger 13 within the vaporization chamber 10 and the feed may be supplied with additional heat by heat exchange with concentrated solution withdrawn from the vaporization chamber by the line 18. It is not essential that the incoming feed solution be preheated by the preheater heat exchanger 36 utilizing, as a source of heat, the hot distillate withdrawn from the condenser heat exchanger 13 in the vaporization chamber 10 or heat derived from the hot concentrated solution withdrawn from the vaporization chamber 10, inasmuch as any other supply of heat may be utilized to preheat the incoming fresh solution. However, the arrangement shown in Fig. 1 is preferable as it is an economical one from the standpoint of minimizing the amount of energy supplied either mechanically or in the form of sensible heat to the system.

In the unit shown in Fig. 1 the vapor from the compressed vapor line 14 may be directed by by-pass line 47, controlled by valve 48, back into the vaporization chamber 10. During the institution of the distillation operation the valve 48 in the by-pass line 47 may be open so that compressed gases and vapors will be circulated repeatedly through the compressor, thereby heating them and assisting in supplying heat to the solution within the vaporization chamber until sufficient vapor is evolved therefrom so that the distillation may be carried on without the by-passing of the compressed vapor through the by-pass line 47. The employment of the by-pass line 47, controlled by the valve 48, is disclosed in the Patent No. 2,280,093 above referred to, and likewise in the prior Kleinschmidt Patents Nos. 2,185,595 and 2,185,596.

According to the present invention the institution of a distillation operation is assisted by introducing vapor from the chamber 31 into the vaporization chamber 10. This may be accomplished by the line 49 which directs vapor from the chamber 31 into the vaporization chamber 10 so as to mix the vapor with solution in the vaporization chamber 10. As shown in Fig. 1 the vapor evolved from the engine cooling liquid is brought into direct contact with the solution in the vaporization chamber 10, the valve 63 being open and the valve 62 in line 61 being closed, and thereby serves to heat the solution and promote the evolution of vapors therefrom. Preferably, the vapors are introduced into the vaporization chamber 10 at a point that is located a few inches, e. g., around 5 to 10 inches, below the normal liquid level that is maintained in the vaporization chamber 10. The line 49 may be controlled by a shut-off valve 50 so that passage of fluid through the line 49 in either direction may be controlled or cut off as may be desired. The line 49 preferably includes a one-way valve 51 which permits vapor to pass from the chamber 31 to the vaporization chamber 10 but prevents any back flow of fluid from the vaporization chamber into the chamber 31.

In instituting a distillation operation using apparatus above described, the fresh solution is fed into the system until the normal liquid level is estabilshed in the vaporization chamber 10. As aforesaid, this normal liquid level is advantageously controlled by the position of the mouth of line 18 which takes off concentrated solution from the vaporization chamber 10. The feed is then discontinued and the compressor, which is operated by the engine 19, is started. Preferably the valve 48 in the by-pass line 47 is open so as to re-circulate gases and vapors through the compressor. As a result of operation of the engine 19, the engine cooling liquid is boiled and generates vapor which accumulates in the chamber 31. By opening the valve 50 this vapor is carried by line 49 into the vaporization chamber 10 where it acts to rapidly heat the solution in the vaporization chamber 10 until vapors are actively evolved therefrom. As soon as the amount of vapors evolved in the vaporization chamber 10 becomes sufficiently great so that the condensation of the vapors in the condenser heat exchanger 13 will serve to maintain the boiling of the solution in the vaporization chamber 10, the valve 48 in the by-pass line 47 is closed, and the valve 50 in the line 49 is also closed. It is not inoperative to permit vapors to pass through the line 49 into the vaporization chamber 10 after the establishment of the distillation conditions, but this is normally not done due to the fact that the vapors evolved from the engine cooling liquid may contain a certain amount of non-condensible vapors which interfere with the efficiency of the condenser heat exchanger 13 if they are permitted to accumulate therein.

After the institution of distillation in the manner above described using heat supplied by fluid that is heated by heat derived from the internal combustion engine, it is preferable, as aforesaid, to continue to utilize the heat supplied by the internal combustion engine in preheating the incoming feed. While it is not necessary to do this in the practice of this invention, the utilization of the engine heat to preheat fresh solution in the feed means of the system, in combination with the special means for heating the solution in the vaporization chamber, is a further feature of this invention which may be carried out in ways such as are illustrated hereinbelow.

The unit as shown in Fig. 1 may be used so as to heat solution in the feed means of the system by heat derived from the internal combustion engine in accordance with the method and means shown in my aforesaid copending application Serial No. 475,401, filed February 10, 1943, for Distillation method and apparatus. By opening the valve 44 in line 46 while valve 43 in line 45 is kept closed, the valve 42 in line 41 also being closed, the incoming feed, after it has passed through the preheater heat exchanger 36, is directed through the lines 46 and 45 to the heat exchange coil 52 which is located in the chamber 31 in the vapor space above the normal liquid level 53 of engine cooling liquid in this chamber. With the unit arranged in this manner the incoming feed is partially preheated in the preheater heat exchanger 36 and thereafter is further heated in the heat exchange coil 52 by out-of-contact heat exchange with the vapors in chamber 31 which are produced by heat derived from the internal combustion engine 19 in maintaining the engine at normal operating temperature. The preheated feed is then directed by the line 54 into the vaporization chamber 10, e. g. at a temperature at or slightly below the boiling point of the solution. As disclosed in my aforesaid copending application, a thermostat 55 may be placed in the line 54 for regulating the action of the thermostatically controlled valve 27 so that the amount of feed may be regulated for bringing the incoming feed to the desired temperature.

In using the arrangement just described, the feed may be cut off during institution of distillation by opening the switch 56 in the line to the thermostatically controlled valve 27 so that the valve 27 will be in its normally closed position. The shut-off valve 25 would also be closed. The institution of distillation can be carried out in the manner above described, namely, the system having been filled with solution to be vaporized, the compressor is then started and the solution in the vaporization chamber 10 is heated by vapor directed through the line 49 into the vaporization chamber. During this operation the feed in the heat exchange coil 52 is brought to the temperature of the vapor but inasmuch as the feed is not being moved through the coil 52, the feed, after it has been brought up to the temperature of the vapors in chamber 31, does not act to condense the vapors in the chamber 31. Therefore, the vapors in chamber 31 are available for being directed through the line 49 into the vaporization chamber 10 in order to bring the solution in this chamber up to its boiling point. As soon as the solution in the vaporization chamber 10 is brought to its boiling point distillation can be initiated and the vapors evolved in chamber 10 are directed to the compressor 11 for compression and subsequent condensation in condenser heat exchanger 13. Upon initiating the distillation operation, the valve 50 in the line 49 may be closed and the flow of incoming feed through line 23 may be started. It is apparent that the feed that has previously been preheated in the heat exchange coil 52 by the vapors contained in the chamber 31 will be taken directly to the vaporization chamber 10 and will not undesirably cool the solution in the vaporization chamber. Moreover, as the distillation operation continues, the incoming feed will continue to be preheated utilizing heat derived from the internal combustion engine. If desired, the rate of feed can be regulated automatically by closing the switch 56, thereby causing the amount of incoming feed to be controlled by the thermostatically operated valve 27.

In the arrangement just described whereby the feed is preheated utilizing heat derived from the internal combustion engine, the feed is passed in series through the preheater heat exchanger 36 and then through the heat exchange coil 52 with the advantages referred to in my copending application Serial No. 475,401 above referred to. If desired, the incoming feed may be preheated by passing the feed through the preheater heat exchanger 36 and through the heat exchange coil 52 when these heat exchangers are in parallel arrangement as described in Patent No. 2,280,093. This can be done by closing the valve 44 in line 46 and by opening the valve 43 in line 45. The valve 42 in line 41 would likewise be open. The by-pass line 26 could be omitted. The incoming feed would therefore be divided into two streams, one stream would pass through line 45 and through the heat exchange coil 52 in being directed to the vaporization chamber 10. The thermostat 55 controls the operation of thermostatically controlled valve 57. By having the switch 56 open and the switch 58 closed, suitable connection between the thermostat 55 and the thermostatically controlled valve 57 can be made. The thermostat 55 and the valve 57 control the amount of feed passing into the vaporization chamber 10 through the line 54, so that this portion of the feed will be preheated to the desired temperature, namely, at or slightly below the boiling point of the solution. The balance of the feed is directed through the preheater heat exchanger 36. A pressure reducing valve 59 may be located in the line 23 so that the feed will preferentially be directed through the line 45 and heat exchange coil 52 and so that only the balance of the feed required to be heated by heat derived from sources other than the internal combustion engine will pass through the preheater exchanger 36. In the preheater heat exchanger 36, the portion of the incoming feed passing through this heat exchanger is heated to the desired extent, preferably to substantially the same extent to which the feed entering the vaporization chamber 10 from line 54 is preheated. A control as to the total hot liquid in heat exchange relation with incoming feed in heat exchanger 36 can be effected by regulation of valves 38 and 40 in order to obtain the desired quantity, if any, of hot concentrated solution directed by line 37 through the heat exchanger 36. When the system is not arranged in the manner just described for preheating streams of incoming feed in parallel, the pressure reduction valve 59 ordinarily is omitted.

It is not essential that the line 49 introduce vapor resulting from vaporization of engine cooling liquid into the vaporization chamber below the normal liquid level of solution contained in the vaporization chamber so as to bubble through solution contained in the vaporization zone for the purpose of heating it. Thus the line 49 could direct vapor resulting from vaporization of the engine cooling liquid into the vapor space above the normal liquid level in vaporization chamber 10 for direct contact with the surface of solution in the vaporization zone. Alternatively, the line 49 could be arranged to direct the vapor from the engine cooling liquid as by line 110 controlled by valve 111 into the vapor suction line 12 or into the pressure vapor line 14 in the region between the compressor 11 and the by-pass line 47 as by line 112 controlled by valve 113, and in such case also, the vapor resulting from vaporization of the engine cooling liquid is to be regarded as introduced into the vaporization chamber for direct contact with solution in the vaporization chamber, for by operating the compressor 11 and opening the valve 48 in by-pass line 47 the vapor resulting from the vaporization of engine cooling liquid is brought into direct contact with solution in the vaporization chamber.

The vapor resulting from vaporization of the engine cooling liquid may be used in other ways to heat solution contained in the vaporization chamber. For example, the line 49 may be arranged to introduce vapor resulting from vaporization of engine cooling liquid as by line 114 controlled by valve 115 into the condenser heat exchanger 13, preferably adjacent the upper portion thereof. In such case the vapors resulting from vaporization of the engine cooling liquid condensing in the condenser heat exchanger 13 would effectively heat the solution contained in the vaporization chamber. Also connection of the line 49 with the pressure vapor line 14 so that vapors resulting from vaporization of engine cooling liqiud will be directed into the condenser heat exchanger 13 from line 14 as by utilization of line 112 controlled by valve 113 will accomplish the purpose just mentioned.

The device that has been shown in Fig. 1 and that has been described hereinabove wherein the vapor resulting from vaporization of engine cooling liquid is brought into heat exchange with solution in the vaporization chamber in such a way that these vapors become commingled with solution contained in the vaporization chamber or with vapors evolved from solution contained in the vaporization chamber, e. g., in any of the ways aforesaid, is suitable where the solution undergoing evaporation includes as one component liquid of the same character as the engine cooling liquid. For example, the engine cooling liquid may be water and the distillation unit may be used in the distillation of an aqueous solution, e. g., sea water. If it is desired to condense the vapor directed through line 49 in out-of-contact heat exchange with solution in the vaporizing chamber, this can readily be done by providing a condenser heat exchange coil 60 through which the vapor can be directed by line 61 controlled by valve 62 in out-of-contact heat exchange relation with solution that is in the vaporization chamber 10. In such case the valve 63 would be closed. The resulting condensate can be discharged through line 64 to waste or may, if desired, be returned to the supply of engine cooling liquid in chamber 31. Such an arrangement would be desirable when, for example, the engine cooling liquid is water and the solution undergoing distillation is a non-aqueous solution.

While it is ordinarily preferable that the coil 60 be disposed in vaporization chamber 10 below the normal liquid level of the solution in chamber 10 due to the fact that the effectiveness of the coil 60 in heating the solution contained in vaporization chamber 10 is greater when so positioned, the coil 60 may, if desired, be positioned in chamber 10 above the normal liquid level of solution in chamber 10 or even in the suction vapor line 12 or the compression vapor line 14.

Also shown in Fig. 1 is an alternative means and method for supplying heat derived from the internal combustion engine to solution contained in the vaporization chamber, which means and method may be used in lieu of, or in conjunction with, the means and method hereinabove described. According to this alternative embodiment, solution in the vaporization chamber 10 is withdrawn therefrom by line 92 by means of the pump 93. The line 92 is controlled by valve 94 which is kept closed in the operation of the embodiments of this invention previously described. The line 92 directs solution through coil 95 in condenser 31, solution in coil 95 being heated by heat exchange with vapor in condenser 31. From coil 95 the heated solution is returned by line 96 to vaporization chamber 10. During institution of distillation, and while the feed is cut off, but while the compressor is being operated by the engine 19, solution in the vaporization chamber is circulated through the coil 95 where it is heated by heat derived from the internal combustion and, after having been heated, is returned to the vaporization chamber. After the solution in the vaporization chamber has been brought to the boiling point, or near the boiling point, the supply of feed to the system can be commenced in any of the manners hereinabove described and distillation maintained. Ordinarily, after the circulation of solution in the vaporization chamber through the coil 95 has served its purpose in instituting distillation, the pump 93 is turned off and the valve 94 closed. The solution taken from the vaporization chamber by line 92 may be taken from any part thereof or level therein so as to heat all or only a portion of the solution in the vaporization chamber as may be desired.

Somewhat more generally there is in the vapor-compression system a region wherein vapor is evolved from solution in the vaporization chamber, the vapor is compressed, and the vapor is condensed in out-of-contact heat exchange relation with the solution in the vaporization chamber, and this region is called herein and in the claims the vapor region of the system. This vapor region, of course, includes the means by which vapor evolved in the vaporization chamber is taken to the compressor, and the means by which compressed vapor is taken from the compressor for condensation in out-of-contact heat exchange relation with the solution in the vaporization chamber. Heat derived from the internal combustion engine that is supplied to this region according to this invention is effective to heat solution contained in the vaporization chamber, and the heat thus supplied is supplied independently of the supply of feed to the vaporization chamber and is useful primarily during institution of distillation while the supply of feed is cut off or substantially cut off. The term "vaporization zone" is used herein and in the claims to refer to that part in the system, namely, the vaporization chamber, wherein there is a body of solution to be distilled and the solution is caused to boil so as to give off vapors which are taken to the compressor during normal operation of the system.

In Fig. 2, a system is shown wherein the engine cooling liquid is directed to the vaporization chamber for use in heating solution contained therein without vaporization of the engine cooling liquid. Such a system is of particular utility in case the engine cooling liquid differs from the solution undergoing distillation, e. g. when the engine cooling liquid is a high-boiling heat transfer liquid and the solution undergoing distillation is an aqueous solution, or when the engine cooling liquid is water and the solution being distilled is a non-aqueous solution of about the same or lower boiling point. The vaporization chamber 10, the compressor 11 and the engine 19 may be the same as previously described in connection with Fig. 1. Also the vapor lines 12 and 14, the condenser heat exchange means 13, the header 15, the shafts 20 and 22, and the transmission gearing 21 may likewise be the same. As in Fig. 1, the condensate flows out of the condenser heat exchange means through the line 17 and the overflow of concentrated solution is discharged through line 18. The vapor by-pass line 47 controlled by the valve 48 may likewise be as in Fig. 1.

The engine-cooling liquid is directed from a suitable source 65 through line 66 to pump 67, which forces it through the engine-cooling passages within the engine-cooling jacket 28 of the internal combustion engine in cooling the engine to normal operating temperature. The heated engine cooling liquid is then directed by the line 68 into the coil 69, that is in the vaporization chamber 10 and that is preferably located as shown in the upper portion of the vaporization chamber, where it is brought into out-of-contact heat exchange relation with solution in the vaporization chamber. In such case the valve 70 in the line 68 would be open and the valve 71 in the by-pass line 72 would be closed. After leaving the coil 69, the engine cooling liquid may then be brought back to the engine through lines 73, 74 and 75, the valve 76 in line 74 in such case being open and the valve 77 in line 73 being closed. If desired, a pressure-reduction valve 78 can be placed in the line 75 in order to maintain the engine cooling liquid under super-atmospheric pressure, thereby inhibiting tendency of the engine cooling liquid to boil in the cooling passages in engine cooling jacket 28.

The coil 69 may be placed in any other location in the vapor region or zone of the system, e. g. above the liquid level in the vaporization chamber, or in the vapor suction line 12 or vapor pressure line 14.

The feed is fed into the system shown in Fig. 2 through the line 79 as by gravity feed or by the pump 80. The line 79 has a shut-off valve 81 which is by-passed by by-pass line 82 controlled by a thermostatically operated valve 83. The feed is directed through the preheater heat exchanger 84 and may be directed from this heat exchanger by the line 85 directly to the vaporization chamber 10, the valves 86 and 97 in line 85 being open. The valve 87 in line 88 in such case would be closed.

The arrangement as shown in Fig. 2 as above described is limited to means for directing engine cooling liquid into out-of-contact heat exchange with solution in the vaporization chamber 10 and no means is disclosed for preheating the incoming solution by heat derived from the internal combustion engine, inasmuch as it is not essential in the practice of this invention that the heat derived from the internal combustion engine be utilized to preheat the incoming fresh solution. Moreover, it is not essential in the practice of this invention that the preheating of incoming fresh solution be effected in a heat exchanger 84 by heat exchange with the hot distillate withdrawn from condenser heat exchanger 13 by line 17 or by this hot distillate plus all or part of the hot concentrated solution withdrawn from the vaporization chamber 10 by the line 18. As with the device shown in Fig. 1, all or part or none of the hot concentrated solution may be passed through the heat exchanger 84 by appropriately controlling the flow of hot concentrated solution through lines 37 and 39 controlled by valves 38 and 40 respectively. Any other suitable preheating arrangement may be employed if desired.

The operation of the device above described is similar to that mentioned hereinabove in connection with the device shown in Fig. 1. Thus in instituting distillation the vaporization chamber is filled with solution and while the feed is shut off the solution in the vaporization chamber is brought to its boiling point by heated engine cooling liquid circulated through the heat exchange coil 69 in vaporization chamber 10. During institution of distillation the valve 48 in the vapor by-pass line 47 may be wholly or partially open. After the distillation has been instituted, then the passing of the engine cooling liquid through the coil 69 may be discontinued and the engine cooling liquid may be maintained at proper temperature by some other cooling means not shown.

Preferably the engine cooling liquid is used to preheat the fresh solution contained in the feed means of the system. This can be done as by providing a second heat exchanger 90 containing a coil 98 or the equivalent through which the incoming feed can be passed by the line 88, the valve 87 in such case being open and the valve 86 in line 85 being closed. Moreover, by closing the valve 76 in line 74 and opening the valve 77 in line 73, the heated engine cooling liquid may be passed through the preheater heat exchanger 90 in out-of-contact heat exchange relation with the feed. With this arrangement, during the institution of distillation while the flow of feed is shut off, the portion of the feed solution in the heat exchanger 90 is heated at the same time that the solution in the vaporization chamber 10 is heated. Therefore, as soon as the solution in the vaporization chamber is brought to its boiling point so that distillation conditions are attained, the feed which is introduced into the vaporization chamber will be preheated and will not cool the solution in the vaporization chamber. As aforesaid, this arrangement is preferable. After distillation conditions have been instituted and during the continuance of the distillation the engine cooling liquid may be passed through the coil 69 and thence through the heat exchanger 90. However, if desired, the flow of engine cooling liquid through the coil 69 may be discontinued by closing the valve 70 and opening the valve 71 in by-pass line 72 thereby causing the engine cooling liquid to circulate through the heat exchanger 90 without being directed through the coil 69.

When the system is arranged so that after distillation conditions have been instituted, the heat derived from the internal combustion engine is used to preheat incoming solution, a thermostat 91 may be placed in the line through which the feed is being carried into the vaporization chamber 10 so that, if desired, the rate of feed can be thermostatically controlled by thermostatic actuation of the thermostatic valve 83.

Alternatively the solution in the vaporization chamber 10 can be heated by heat derived from the internal combustion engine by withdrawing solution from the chamber, heating the solution while withdrawn by out-of-contact heat exchange with heated engine cooling liquid and returning the heated solution to the vaporization chamber. Referring to Fig. 2, by closing valves 86, 87 and 97, solution in the vaporization chamber can be pumped by pump 99 from the vaporization chamber through line 100, coil 98 in heat exchanger 90, and back to the upper portion of the vaporization chamber through line 101. Lines 100 and 101 are controlled by valves 102 and 103 respectively, which valves are closed when the system shown in Fig. 2 is used in the manner previously described. During institution of distillation the feed is cut off and solution in the vaporization chamber is circulated through the coil 98 in heat exchange with heated engine cooling liquid in heat exchanger 90. The heated engine cooling liquid may be taken to the heat exchanger 90 without being conducted through the coil 69, thereby heating the solution in the vaporization chamber 10 solely by circulating it through heat exchanger 90; or the engine cooling liquid may be passed through the coil 69 so as to heat the solution in vaporization chamber 10 in this manner as well. After the solution in the vaporization chamber 10 has been brought to desired temperature the pump 99 is turned off and the valves 102 and 103 closed, and by opening valve 97 and one or the other of valves 86 or 87, distillation may be maintained upon commencing the supply of feed to the system.

In Fig. 2 the coil 98 is used for heating solution withdrawn from the vaporization zone during institution of distillation, and then, by making appropriate changes in valve controlled lines, is used to preheat incoming solution after distillation has commenced. If desired, separate coils could be used to preheat the incoming feed and for recirculating solution from the vaporization chamber 10 during institution of distillation, analogously to the use of separate coils 52 and 95 in condenser 31 in Fig. 1. Conversely, a single coil could be employed in condenser 31 of Fig. 1, analogously to the employment of the single coil 98 in heat exchanger 90 of Fig. 2.

While this invention has been described in connection with certain illustrative embodiments thereof and in connection with certain typical distillation methods, it is apparent that other arrangements are possible within the scope of this invention. For example, it is apparent that the device shown in Fig. 2 may be modified so that the incoming feed is heated by heat exchangers 84 and 90 with these heat exchangers arranged in parallel after the manner set forth in the Patent No. 2,280,093 above referred to. While in the systems shown in Figs. 1 and 2 a separate engine cooling liquid is used, it is apparent that solution to be distilled could be used as the engine cooling liquid, e. g. as in a system of the kind shown in Patent No. 2,280,093, aforesaid, or in my application Serial No. 475,401 aforesaid, that is arranged so that the solution to be distilled is passed directly through the cooling passages of the engine inasmuch as the solution heated in the engine jacket could be recirculated through the vaporization chamber to heat the solution in the vaporization chamber during institution of distillation as hereinabove described in carrying out the present invention. For purposes of illustration, means for circulating solution withdrawn from the vaporization chamber 10 directly through the cooling passages of the internal combustion engine have been shown in Fig. 2. By opening the valve 104 in line 105 (valves 76 and 77 being closed) the pump 67 will pump solution from the vaporization chamber 10 to and through the engine cooling passages in the jacket 28 of engine 19. And by opening the valve 106 in line 107 (valves 70 and 72 being closed) the solution withdrawn from chamber 10 and heated in the engine cooling passages can be returned to the chamber, and this can be continued until the solution in the vaporization chamber 10 has been brought to desired temperature. Thereafter by closing valves 104 and 106 and by opening either of valves 70 or 71, and either of valves 76 or 77, distillation can be maintained in any of the manners hereinabove described.

Other variations are also possible in practicing this invention. Thus a variety of different types of compressors, vaporization chambers, heat exchange devices, piping arrangements, etc., may be employed as may be desired for different situations for which the apparatus may be designed, while still utilizing this invention, whereby heat derived from the internal combustion engine that operates the compressor part of the system is used to heat solution contained in the vaporization chamber during institution of distillation and independently of the supply of feed to the vaporization chamber, and the scope of this invention is to be governed by the language of the following claims.

I claim:

1. In instituting a method of distillation wherein a solution is heated in a vaporization zone with evolution of vapor in said vaporization zone, the evolved vapor is directed to a compressor, the evolved vapor is compressed by said compressor to a pressure at which the condensing temperature of the vapor is above the boiling point of the solution, compressed vapor is directed to a heat exchanger, the compressed vapor is condensed in said heat exchanger in out-of-contact heat-exchange relation with said solution in said vaporization zone, hot condensate is withdrawn from said vaporization zone, fresh solution to be distilled is introduced into said vaporization zone, and power for operating said compressor is supplied by an internal combustion engine, the region where said vapor is evolved from solution in said vaporization zone, is directed to said compressor, is compressed by said compressor, is directed from said compressor to said heat exchanger and is condensed in said heat exchanger in out-of-contact heat-exchange relation with solution in said vaporization zone being the vapor region of the system, the steps comprising introducing a body of solution into said vaporization zone, then substantially cutting off the feed of fresh solution into said vaporization zone, and heating said body of solution in the vaporization zone by heating a fluid by heat derived from said internal combustion engine in cooling same and directing said heated fluid into said vapor region of the system to heat said body of solution contained in said vaporization zone independently of the supply of feed to said vaporization zone and irrespective of and supplemental to any heat supplied by introducing any additional fresh solution into the body of solution in the vaporization zone.

2. In a method of distillation wherein a solution is heated in a vaporization zone with evolution of vapor in said vaporization zone, the evolved vapor is directed to a compressor, the evolved vapor is compressed by said compressor to a pressure at which the condensing temperature of the vapor is above the boiling point of the solution, compressed vapor is directed to a heat exchanger, the compressed vapor is condensed in said heat exchanger in out-of-contact heat exchange relation with said solution in said vaporization zone, hot condensate is withdrawn from said vaporization zone, fresh solution to be distilled is introduced into said vaporization zone, and power for operating said compressor is supplied by an internal combustion engine, the region where said vapor is evolved from solution in said vaporization zone, is directed to said compressor, is compressed by said compressor, is directed from said compressor to said heat exchanger and is condensed in said heat exchanger in out-of-contact heat-exchange relation with solution in said vaporization zone being the vapor region of the system, the steps comprising introducing a body of solution into said vaporization zone, heating engine cooling liquid by heat derived from said internal combustion engine in cooling same with evolution of vapor from said engine cooling liquid and during initiation of the distillation operation directing vapor evolved from said engine cooling liquid into said vapor region of the system to heat said body of solution contained in said vaporization zone, said vapor evolved from said engine cooling liquid and directed into the vapor region of the system being irrespective of and supplemental to any feeding of fresh solution to said body of solution in said vaporization zone and the heat supplied to said body of solution in the vaporization zone by said vapor directed into the vapor region of the system being supplemental to and independent of any heat supplied to said body of solution in said vaporization zone by any feed directed therein thereby causing accumulation of heat in said body of solution within the vaporization zone, and the supply of engine cooling liquid for producing said vapor which is directed into the vapor region of the system being independent of the supply of feed.

3. In a method according to claim 2, the steps recited in said claim, the vapor evolved from said engine cooling liquid being introduced into direct contact with said solution in said vaporization zone.

4. In a method of distillation wherein a solution is heated in a vaporization zone with evolution of vapor in said vaporization zone, the evolved vapor is directed to a compressor, the evolved vapor is compressed by said compressor to a pressure at which the condensing temperature of the vapor is above the boiling point of the solution, compressed vapor is directed to a heat exchanger, the compressed vapor is condensed in said heat exchanger in out-of-contact heat exchange relation with said solution in said vaporization zone, hot condensate is withdrawn from said vaporization zone, fresh solution to be distilled is introduced into said vaporization zone, and power for operating said compressor is supplied by an internal combustion engine, the region where said vapor is evolved from solution in said vaporization zone, is directed to said compressor, is compressed by said compressor, is directed from said compressor to said heat exchanger and is condensed in said heat exchanger in out-of-contact heat-exchange relation with solution in said vaporization zone being the vapor region of the system, the steps comprising heating engine cooling liquid by heat derived from said internal combustion engine in cooling same and during initiation of the distillation operation directing said heated engine cooling liquid into said vapor region of the system in out-of-contact heat-exchange relation with fluid in said region to heat solution contained in said vaporization zone.

5. In a method according to claim 4, the steps recited in said claim, said heated engine cooling liquid being introduced into said vaporization zone in out-of-contact heat-exchange relation with said solution contained in said vaporization zone.

6. In instituting a method of distillation wherein a solution is heated in a vaporization zone with evolution of vapor in said vaporization zone, the evolved vapor is compressed by a compressor to a pressure at which the condensing temperature of the vapor is above the boiling point of the solution, compressed vapor is condensed in out-of-contact heat-exchange relation with solution in said vaporization zone, hot condensate is withdrawn from said vaporization zone, fresh solution to be distilled is introduced into said vaporization zone, and power for operating said compressor is supplied by an internal combustion engine, the steps comprising withdrawing solution from said vaporization zone, heating said solution while withdrawn from said vaporization zone by heat derived from said internal combustion engine, and returning said heated solution to said vaporization zone.

7. In a method of distillation wherein a solution is heated in a vaporization zone with evolution of vapor in said vaporization zone, the evolved vapor is directed to a compressor, the evolved vapor is compressed by said compressor to a pressure at which the condensing temperature of the vapor is above the boiling point of the solution, compressed vapor is directed to a heat exchanger, the compressed vapor is condensed in said heat exchanger in out-of-contact heat-exchange relation with said solution in said vaporization zone, hot condensate is withdrawn from said vaporization zone, fresh solution to be distilled is introduced into said vaporization zone, and power for operating said compressor is supplied by an internal combustion engine, the region where said vapor is evolved from solution in said vaporization zone, is directed to said compressor is compressed by said compressor, is directed from said compressor to said heat exchanger and is condensed in said heat exchanger in out-of-contact heat-exchange relation with solution in said vaporization zone being the vapor region of the system, the steps comprising introducing a body of solution into said vaporization zone, then substantially cutting off the feed of fresh solution into said vaporization zone and heating said body of solution in said vaporization zone by heating a fluid by heat derived from said internal combustion engine in cooling same, directing said heated fluid into said vapor region of the system to heat said body of solution contained in said vaporization zone during initiation of the distillation operation while the supply of feed is substantially cut off and irrespective of and supplemental to any heat supplied by introducing any additional fresh solution into the body of solution in the vaporization zone, simultaneously heating solution to be introduced into said vaporization zone for distillation therein by heat derived from said internal combustion engine, and upon initiation of the distillation operation introducing said preheated solution into said distillation zone for distillation therein.

8. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat-exchange relation with solution in said vaporization chamber, an internal combustion engine arranged to actuate said compressor to compress vapor therein, feed means for introducing solution to be distilled into said vaporization chamber, and means for withdrawing concentrated solution from said vaporization chamber, said vaporization chamber, said compressor, said condenser heat exchange means, and said means for directing vapor from said chamber to said compressor and from said compressor to said condenser heat exchange means being the vapor region of the apparatus, of heating means for heating solution contained in said vaporization chamber, said heating means comprising means for heating a fluid by heat derived from said internal combustion engine in cooling same, means for directing said heated fluid into said vapor region of the apparatus for heating solution contained in said vaporization chamber while the feed supplied by said feed means is cut off and means for maintaining independently of said feed means and while said feed means is cut off, a supply of the fluid heated by heat derived from said internal combustion engine and directed to the vapor region of the apparatus for heating solution contained in the vaporization chamber.

9. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat exchange relation with solution in said vaporization chamber, an internal combustion engine arranged to actuate said compressor to compress vapor therein, feed means for introducing solution to be distilled into said vaporization chamber, and means for withdrawing concentrated solution from said vaporization chamber, said vaporization chamber, said compressor, said condenser heat exchange means, and said means for directing vapor from said chamber to said compressor and from said compressor to said condenser heat exchange means being the vapor region of the apparatus, of heating means for heating solution contained in said vaporization chamber, said heating means comprising engine cooling means for directing engine cooling liquid into contact with heated surface of said internal combustion engine to effect vaporization of said engine cooling liquid, separator means for separating evolved vapor from residual engine cooling liquid, and means for directing said vapor evolved from said engine cooling liquid from said separator means into said vapor region of the apparatus for heating solution contained in said vaporization chamber.

10. Distillation apparatus according to claim 9 wherein said means for directing vapor evolved from said engine cooling liquid into said vapor region of the apparatus is arranged to discharge said vapor evolved from said engine cooling liquid into direct contact with solution contained in said vaporization chamber.

11. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat-exchange relation with solution in said vaporization chamber, an internal combustion engine arranged to actuate said compressor to compress vapor therein, feed means for introducing solution to be distilled into said vaporization chamber, and means for withdrawing concentrated solution from said vaporization chamber, said vaporization chamber, said compressor, said condenser heat exchange means, and said means for directing vapor from said chamber to said compressor and from said compressor to said condenser heat exchange means being the vapor region of the apparatus, of heating means for heating solution contained in said vaporization chamber, said heating means comprising engine cooling means adapted to transfer heat from said internal combustion engine to an engine cooling liquid, means for directing said heated engine cooling liquid into said vapor region of the apparatus in out-of-contact heat exchange relation with fluid in said region to heat solution in said vaporization chamber, and means for returning the cooled engine cooling liquid to said engine-cooling means.

12. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat-exchange relation with solution in said vaporization chamber, an internal combustion engine arranged to actuate said compressor to compress vapor therein, feed means for introducing solution to be distilled into said vaporization chamber, and means for withdrawing concentrated solution from said vaporization chamber, of heating means for heating solution contained in said vaporization chamber, said heating means comprising means for withdrawing solution from said vaporization chamber, means for heating said withdrawn solution by heat derived from said internal combustion engine, and means for returning the said withdrawn solution from said means for heating same to said vaporization chamber.

13. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat exchange relation with solution in said vaporization chamber, an internal combustion engine arranged to actuate said compressor to compress vapor therein, feed means for introducing solution to be distilled into said vaporization chamber, and means for withdrawing concentrated solution from said vaporization chamber, said vaporization chamber, said compressor, said condenser heat exchange means, and said means for directing vapor from said chamber to said compressor and from said compressor to said condenser heat exchange means being the vapor region of the apparatus, of engine cooling means for heating a fluid by heat derived from said internal combustion engine in cooling said engine, means for directing said heated fluid into said vapor region for heating solution contained in said vaporization chamber, means for bringing said heated fluid in out-of-contact heat-exchange relation with fresh solution contained in said feed means to preheat same, means for controlling the flow of fresh solution through said feed means, and means for controlling the flow of said heated fluid into said vaporization chamber.

14. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat-exchange relation with solution in said vaporization chamber, an internal combustion engine arranged to actuate said compressor to compress vapor therein, feed means for introducing solution to be distilled into said vaporization chamber, and means for withdrawing concentrated solution from said vaporization chamber, said vaporization chamber, said compressor, said condenser heat exchange means, and said means for directing vapor from said chamber to said compressor and from said compressor to said condenser heat exchange means being the vapor region of the apparatus, of means for directing engine cooling liquid into contact with heated surface of said internal combustion engine to partially convert said liquid into vapor, means for directing fresh solution fed into said vaporization chamber by said feed means in out-of-contact heat exchange with said vapor evolved from said engine cooling liquid to preheat said fresh solution, and means for directing said vapor evolved from said engine cooling liquid into said vapor region for heating solution contained in said vaporization chamber irrespective of the supply of feed of fresh solution by said feed means to said vaporization chamber.

15. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat-exchange relation with solution in said vaporization chamber, an internal combustion engine arranged to actuate said compressor to compress vapor therein, feed means for introducing solution to be distilled into said vaporization chamber, and means for withdrawing concentrated solution from said vaporization chamber, of engine cooling means for heating engine cooling liquid by heat derived from said internal combustion engine in cooling said engine, means for directing heated engine cooling liquid into said vaporization chamber in out-of-contact heat exchange with solution in said vaporization chamber, and means for directing heated engine cooling liquid in out-of-contact heat exchange relation with fresh solution contained in said feed means to preheat same.

16. In distillation apparatus according to claim 15, the combination recited in said claim arranged so that the heated engine cooling liquid is first directed into said vaporization chamber in out-of-contact heat exchange relation with the contents of said chamber to heat solution contained therein and thereafter is directed from said vaporization chamber in out-of-contact heat exchange relation with fresh solution contained in said feed means.

17. Distillation apparatus comprising the combination with a vaporization chamber, a compressor for compressing vapor, means arranged for directing vapor from said vaporization chamber into said compressor for compression therein, condenser heat exchange means arranged to maintain a condensing vapor in out-of-contact heat exchange with solution in said vaporization chamber, means for directing compressed vapor from said compressor and into said condenser heat exchange means in out-of-contact heat-exchange relation with solution in said vaporization chamber, an internal combustion engine arranged to actuate said compressor to compress vapor therein, feed means for introducing solution to be distilled into said vaporization chamber, and means for withdrawing concentrated solution from said vaporization chamber, of heating means for heating solution in said vaporization chamber, and of feed preheating means for preheating solution contained in said feed means, said heating means including means for heating a fluid by heat derived from said internal combustion engine, means for directing said heated fluid into said vaporization chamber for heat exchange with solution contained in said vaporization chamber and means for maintaining said supply of heated fluid to heat solution in said vaporization chamber irrespective of feed of fresh solution by said feed means to said vaporization chamber, and said feed preheating means including means for directing condensate from said condenser heat exchange means in out-of-contact heat exchange with solution contained in said feed means, and means arranged to transfer heat derived from said internal combustion engine in cooling same to solution contained in said feed means.

18. In instituting a method of distillation wherein a solution is heated in a vaporization zone with evolution of vapor in said vaporization zone, the evolved vapor is compressed by a compressor to a pressure at which the condensing temperature of the vapor is above the boiling point of the solution, compressed vapor is condensed in out-of-contact heat-exchange relation with solution in said vaporization zone, hot condensate is withdrawn from said vaporization zone, fresh solution to be distilled is introduced into said vaporization zone and power for operating said compressor is supplied by an internal combustion engine, the step of transferring sensible heat withdrawn from said engine in cooling same to the body of solution in the vaporization zone, such heat transfer being irrespective of and supplemental to any heat supplied to the body of solution in the vaporization zone because of the temperature of any additional fresh solution that is introduced into said vaporization zone at the point where such additional fresh solution enters said vaporization zone and being effected by a fluid medium the supply of which is independent of the supply of fresh solution into the vaporization zone, thereby causing said body of solution in the vaporization zone to accumulate heat with resultant elevation of the temperature thereof.

19. In a method of distillation wherein a solution is heated in a vaporization zone with evolution of vapor in said vaporization zone, the evolved vapor is directed to a compressor, the evolved vapor is compressed by said compressor to a pressure at which the condensing temperature of the vapor is above the boiling point of the solution, compressed vapor is directed to a heat exchanger, the compressed vapor is condensed in said heat exchanger in out-of-contact heat exchange relation with said solution in said vaporization zone, hot condensate is withdrawn from said vaporization zone, fresh solution to be distilled is introduced into said vaporization zone, and power for operating said compressor is supplied by an internal combustion engine, the region where said vapor is evolved from solution in said vaporization zone, is directed to said compressor, is compressed by said compressor, is directed from said compressor to said heat exchanger and is condensed in said heat exchanger in out-of-contact heat-exchange relation with solution in said vaporization zone being the vapor region of the system, the steps comprising introducing a body of solution into said vaporization zone, heating engine cooling liquid by heat derived from said internal combustion engine in cooling same with evolution of vapor from said engine cooling liquid and during initiation of the distillation operation directing vapor evolved from said engine cooling liquid into said vapor region of the system to heat said body of solution contained in said vaporization zone, said vapor evolved from said engine cooling liquid and directed into the vapor region of the system being irrespective of and supplemental to any feeding of fresh solution to said body of solution in the vaporization zone, and said vapor evolved from said engine-cooling liquid being introduced into the vapor region of the system on the compression side of the compressor and being condensed in said heat exchanger in out-of-contact heat exchange with the body of solution in the vaporization zone.

20. Apparatus according to claim 9 wherein said means for directing vapor evolved from said engine-cooling liquid into said vapor region of the apparatus is arranged to discharge said vapor evolved from said engine-cooling liquid into the vapor region of the apparatus on the compression side of the compressor.

ALLEN LATHAM, Jr.